United States Patent [19]

Bayer

[11] Patent Number: 4,912,837

[45] Date of Patent: Apr. 3, 1990

[54] METHOD OF AND APPARATUS FOR MAKING SPACER FRAMES FOR USE IN MULTIPLE-PANE WINDOWS

[75] Inventor: Franz Bayer, Elzach, Fed. Rep. of Germany

[73] Assignee: Franz Xaver Bayer Isolierglasfabrik KG, Elzach, Fed. Rep. of Germany

[21] Appl. No.: 280,401

[22] Filed: Dec. 5, 1988

[30] Foreign Application Priority Data

Dec. 3, 1987 [DE] Fed. Rep. of Germany ....... 3740922

[51] Int. Cl.[4] ........................ B23P 11/02; B23P 23/04; B23P 25/00

[52] U.S. Cl. ........................................ 29/451; 29/458; 29/525; 29/33 T; 29/33 K; 52/172; 53/471; 72/298; 72/369; 403/292

[58] Field of Search ............... 29/525, 458, 33 T, 451, 29/33 K; 52/172; 72/46, 298, 369; 53/473, 476, 467, 471; 403/401, 292, 295, 402; 141/1

[56] References Cited

U.S. PATENT DOCUMENTS

| | | | |
|---|---|---|---|
| 2,910,730 | 11/1959 | Risch | 53/471 X |
| 3,030,673 | 4/1962 | London | 52/172 |
| 3,183,560 | 5/1965 | Brichard | 403/295 X |
| 4,074,780 | 2/1978 | Burton | 52/172 X |
| 4,322,926 | 4/1982 | Wolflingseder et al. | 52/172 |
| 4,357,744 | 11/1982 | McKenzie et al. | 29/451 |
| 4,453,855 | 6/1984 | Richter et al. | 403/402 X |
| 4,461,509 | 7/1984 | Yaotani et al. | 403/292 X |
| 4,530,195 | 7/1985 | Leopold | 29/451 X |
| 4,564,540 | 1/1986 | Davies et al. | 52/172 X |
| 4,608,802 | 9/1986 | Bayer | 52/401 X |
| 4,627,263 | 12/1986 | Bayer et al. | 72/298 |
| 4,630,959 | 12/1986 | Glaser | 403/392 X |
| 4,651,482 | 3/1987 | Borys | 52/172 |
| 4,683,634 | 8/1987 | Cole | 29/458 X |
| 4,691,486 | 9/1987 | Niekrasz et al. | 52/172 |
| 4,720,950 | 1/1988 | Bayer et al. | 52/172 |

FOREIGN PATENT DOCUMENTS

| | | |
|---|---|---|
| 0009703 | 4/1980 | European Pat. Off. . |
| 0103111 | 3/1984 | European Pat. Off. . |
| 0195176 | 9/1986 | European Pat. Off. . |
| 0197468 | 10/1986 | European Pat. Off. . |
| 0252066 | 1/1988 | European Pat. Off. . |
| 2644852 | 4/1978 | Fed. Rep. of Germany . |
| 2938362 | 4/1980 | Fed. Rep. of Germany . |
| 3223881 | 7/1983 | Fed. Rep. of Germany . |
| 3221986 | 12/1983 | Fed. Rep. of Germany . |
| 0642713 | 4/1984 | Switzerland . |

*Primary Examiner*—Charlie T. Moon
*Attorney, Agent, or Firm*—Peter K. Kontler

[57] ABSTRACT

Successive hollow polygonal bodies which are made of a ductile material and each of which has three corners and two straight open-ended terminal portions are converted into rectangular spacer frames for use between the panes of multiple pane windows by orienting the polygonal bodies in such a way that the terminal portions extend downwardly from their open ends, by admitting metered quantities of a flowable desiccant into selected parts of the two terminal portions, by converting one of the terminal portions into an L-shaped frame member with a section which is in register with the other terminal portion, and by inserting sealing plugs into the open ends of the two terminal portions.

58 Claims, 6 Drawing Sheets

Fig. 9
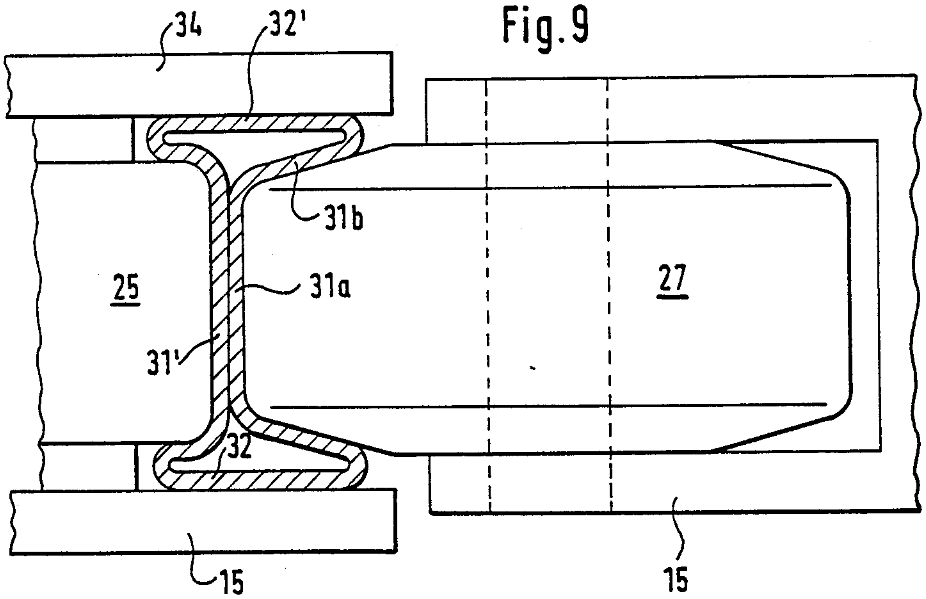
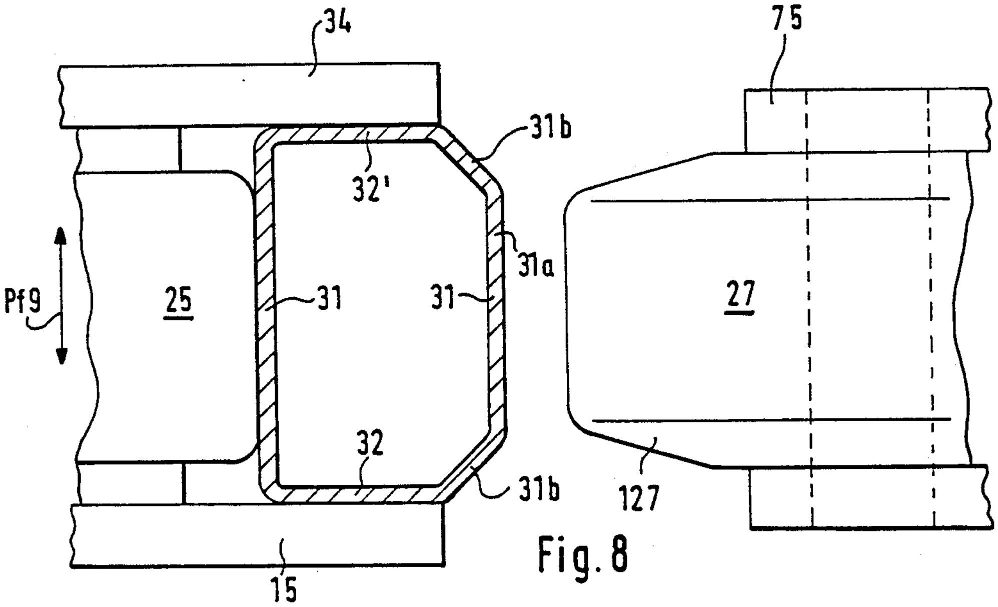
Fig. 8

METHOD OF AND APPARATUS FOR MAKING SPACER FRAMES FOR USE IN MULTIPLE-PANE WINDOWS

BACKGROUND OF THE INVENTION

The invention relates to improvements in methods of and in apparatus for making spacer frames for use between the panes of multiple-pane windows or the like. More particularly, the invention relates to improvements in methods and apparatus of the type disclosed in commonly owned U.S. Pat. Nos. 4,627,263 and 4,720,950 to Bayer et al.

It is known to convert elongated tubular blanks of ductile material into polygonal or otherwise configurated spacers or spacer frames which are at least partially filled with a flowable hygroscopic substance (desiccant) and are ready for insertion between the panes of a multiple-pane window. The desiccant prevents moisture which penetrates into a multiple-pane window from clouding the inner sides of the panes-which flank the spacer frame. It is further known to convert successive tubular blanks of ductile material into a series of substantially rectangular bodies prior to admission of flowable desiccant and to leave the ends of the thus deformed blanks open for admission of desiccant prior to conversion of such bodies into spacer frames. The arrangement is such that each rectangular body is formed with three bends, corners or elbows and the body is open in the region which is to constitute the fourth elbow of a rectangular spacer frame. This is desirable and advantageous because three elbows can be formed by simply bending the corresponding portions of the respective blanks. The fourth elbow is formed by moving the open ends of the rectangular body into abutment with each other. Presently known methods and apparatus employ connectors, which are used in the region of the fourth elbow to establish a seal and to thus prevent escape of admitted desiccant. The application of connectors is a complex and timeconsuming procedure which contributes significantly to the cost of spacer frames. Moreover, the elbows which are sealed by such connectors are frequent sources of leaks, i.e., desiccant is likely to escape from the multiple-pane window and/or into the space between the panes which flank the spacer frame.

Commonly owned published German patent application No. 32 21 986 of Bayer discloses an apparatus which is designed to make spacer frames and is provided with means for admitting a flowable desiccant into the internal spaces of tubular blanks prior to bending of such blanks into polygonal intermediate products or into finished spacer frames with one, two or more elbows. The spacer frames are sealed in regions between two neighboring elbows. This simplifies the sealing operation. However, bending of blanks which are filled with desiccant presents other problems; for example, a desiccantcontaining blank is likely to burst in the regions of the elbows. The aforementioned commonly owned U.S. Pat. Nos. 4,627,263 and 4,720,950 disclose means for reducing the likelihood of bursting of tubular blanks in regions where the blanks are bent to form elbows. Another possibility of reducing the likelihood of bursting of desiccant-containing tubular blanks in the regions of elbows is to increase the diameters of the elbows; this is not acceptable in many types of multiple-pane windows because the elbows are visible at the corners of the panes which flank such spacer frames. Moreover, apparatus of the type disclosed in U.S. Pat. Nos. 4,627,263 and 4,720,950 can be used with full advantage when the walls of hollow tubular blanks are sufficiently thick and when the material of the blanks exhibits a pronounced ductility. Such materials and thick-walled hollow tubular blanks contribute to the cost of spacer frames.

Published European patent application No. 0 252 066 of Lisec discloses a control system which can be used in apparatus for making multiple-pane windows with spacer frames between neighboring panes. The control system includes means for regulating the operation of the device which admits desiccant into the spacer frames. The extent to which a flowable desiccant is to fill the interior of a-spacer frame is not disclosed.

Published European patent application No. 0 197 468 of Lenhardt discloses a method of and an apparatus for making multiple-pane windows wherein the spacer frame is completely filled with a desiccant and is installed between two panes immediately after the making of perforations in the spacer frame is completed. The perforations enable the confined desiccant to absorb moisture which has penetrated into the space between the panes flanking the installed frame.

Swiss Pat. No. 642 713 to Bröcking discloses a spacer frame which is practically completely filled with a granular desiccant. Such desiccant is admitted into the tubular blank prior to making of the elbows for conversion of the blank into a spacer frame.

European Pat. No. 0 103 111 to Glaser discloses a method of filling tubular blanks with a desiccant and of thereupon confining the introduced desiccant by injecting into selected portions of the blank blobs of a hardenable -adhesive prior to severing of the blank adjacent the thus obtained plugs.

Published German patent application No. 32 23 881 of Lisec discloses an apparatus for bending a tubular blank in such a way that the elbows exhibit portions having different radii of curvature.

Published German patent application No. 29 38 362 of Sernevi discloses an apparatus which admits granular material into hollow profiled bodies and is equipped with means for introducing sealing plugs into the open ends of profiled bodies so as to confine the supplies of granular material therein.

Published German patent application No. 26 44 852 of Schilling discloses apparatus for admitting metered quantities of desiccant into spacer frames for use between the panes of multiple-pane windows.

Published European patent application No. 0 195 176 of Lisec discloses specially designed valves which can be used to regulate the flow of desiccant into spacer frames for use in multiple-pane windows.

Published European patent application No. 0 009 703 of Wölflingseder discloses apparatus for providing a tubular blank with elbows in order to convert the blank into a spacer frame. The apparatus comprises a milling tool which cuts into the blank slits in the space between two clamping devices before the blank is bent in the region of the thus formed slots.

OBJECTS OF THE INVENTION

An object of the invention is to provide a novel and improved method of converting elongated tubular blanks of ductile material into desiccant-containing spacer frames for use in multiple-pane windows in a simple, time-saving and inexpensive way.

Another object of the invention is to provide a method which can be resorted to for the making of spacer frames from thin-walled inexpensive tubular blanks.

A further object of the invention is to provide a method which renders it possible to make spacer frames with plural bends, corners or elbows in such a way that the locus where the ends of the blanks are sealed is spaced apart from the corners.

An additional object of the invention is to provide a novel and improved method of introducing a hygroscopic material into spacer frames for use in multiple-pane windows.

Still another object of the invention is to provide a novel and improved method of holding and orienting partially finished spacer frames in the course of desiccant-admitting and sealing operations.

A further object of the invention is to provide a method which exhibits the advantages but does not embody the drawbacks of heretofore known methods.

Another object of the invention is to provide a novel and improved method of making corners in hollow tubular blanks of ductile material during conversion of such blanks into spacer frames.

An additional object of the invention is to provide a novel and improved method of selecting the extent to which a spacer frame is filled with desiccant.

A further object of the invention is to provide a novel and improved apparatus for the practice of the above outlined method.

An additional object of the invention is to provide the apparatus with novel and improved means for introducing a flowable hygroscopic material into partially finished spacer frames.

Another object of the invention is to provide the apparatus with novel and improved means for holding, orienting and otherwise manipulating blanks and partially finished spacer frames preparatory to, during and after admission of desiccant.

An additional object of the invention is to provide the apparatus with novel and improved means for sealing selected quantities of desiccant in the interior of finished spacer frames.

A further object of the invention is to provide the apparatus with novel and improved combined blank orienting and blank deforming means.

Another object of the invention is to provide a simple, compact and inexpensive apparatus whose operation can be automated to any desired degree and which can make highly satisfactory spacer frames from relatively inexpensive blanks with substantial savings in desiccant.

An additional object of the invention is to provide an apparatus which constitutes a substantial improvement over heretofore known apparatus, not only as concerns its ability to form high-quality spacer frames but also as regards its output, simplicity and versatility.

Another object of the invention is to provide an apparatus which can be rapidly converted for the treatment of larger, smaller, thinner, thicker, highly ductile, relatively stiff, long, short, narrow or wide tubular blanks.

A further object of the invention is to provide a versatile apparatus which can be used for the treatment of available tubular blanks and which can impart to treated blanks a size and/or shape matching or very closely approaching an optimum size and/or shape.

SUMMARY OF THE INVENTION

One feature of the invention resides in the provision of a method of making a spacer frame for use between the panes of a multiple-pane window. The method comprises the steps of transforming a hollow elongated tubular blank of ductile material (such as thin sheet steel stock) into a polygonal body with a plurality of elbows, bends or corners (hereinafter called corners) and mutually inclined open-ended first and second terminal portions each of which is adjacent a different corner, introducing a flowable hygroscopic material (hereinafter called desiccant) only into at least one terminal portion of the polygonal body (preferably only into a part of the at least one terminal portion), thereupon converting the first terminal portion of the polygonal body into a substantially L-shaped or V-shaped frame member having a first section adjacent and extending from one of the corners, a second section which abuts or is adjacent the second terminal portion, and a corner between the first and second sections, and establishing a seal between the second terminal portion and the second section of the converted first terminal portion.

The method preferably further comprises the step of maintaining the polygonal body in the course of the introducing step in such orientation that the at least one terminal portion slopes downwardly from its open end. The maintaining step can include suspending the polygonal body and keeping at least one selected part of the suspended body in abutment with a vertical or inclined surface, e.g., with one side of a plate-like wall or cheek forming part of the frame or housing of an apparatus for the practice of the improved method.

The introducing step can include pneumatically conveying (particularly blowing) flowable desiccant into the open end of the at least one terminal portion of the polygonal body. Alternatively, or in addition to the conveying of flowable desiccant by pneumatic means, the introducing step can include conveying desiccant into the at least one terminal portion of the polygonal body by gravity flow.

The step of establishing a seal can include inserting a plug into the open end of the second terminal portion, and the introducing step can include admitting desiccant into the second terminal portion so that the admitted desiccant fills only a certain part of the second terminal portion and leaves the open end empty. Such open end can receive one end portion of a plug which confines the admitted desiccant in the second terminal portion, namely between the plugged open end and the nearest corner of the spacer frame. Of course, that portion or those portions of the spacer frame which contain desiccant are provided with holes in the form of bores, slits, perforations or the like so as to enable the confined desiccant to absorb moisture which happens to penetrate into the space within the frame, i.e., into the space between the panes which flank the spacer frame when the latter is installed in a multiple-pane window.

If a metered quantity of desiccant is admitted into the first terminal portion of the polygonal body, it is admitted only into that part of the first terminal portion which constitutes the first section of the substantially L-shaped frame member, i.e., that part of the first terminal portion which is converted into a corner is preferably devoid of desiccant so that the desiccant cannot interfere with the bending operation and such bending operation results in the formation of a corner having a predetermined profile and being free of cracks or other defects.

Another feature of the invention resides in the provision of an apparatus for making a spacer frame for use between the panes of a multiple-pane window or the like from a hollow polygonal body having a plurality of corners (e.g., three corners) and mutually inclined first and second open-ended terminal portions each of which is adjacent a different corner. The improved apparatus comprises means for introducing a flowable desiccant into at least one of the terminal portions so as to only partially fill the at least one terminal portion, means for converting the first terminal portion into a substantially L-shaped frame member having a first section adjacent the respective corner, a second section abutting or adjacent the second terminal portion, and a corner between the first and second sections, and means for establishing a seal between the second terminal portion and the second section.

The introducing means comprises a device (e.g., including one or more adjustable valves) for admitting a metered quantity of flowable desiccant into the at least one terminal portion of the polygonal body.

The converting means is preferably adjacent, most preferably closely adjacent, the introducing means. The converting means can include means (such as a clamping unit with jaws or claws which are movable toward and away from each other) for engaging that part of the first terminal portion which constitutes the first section of the substantially L-shaped frame member upon conversion of first terminal portion into such frame member. The converting means can further comprise an additional clamping unit with jaws which can engage the second terminal portion of the polygonal body during conversion of first terminal portion into a substantially L-shaped frame member.

The introducing means can further comprise an outlet which is adjacent the open end of the at least one terminal portion prior to conversion of first terminal portion into a substantially L-shaped frame member, and means (e.g., in the form of one or more channels or the like) for discharging into the open end of the at least one terminal portion a metered quantity of flowable desiccant by way of the outlet prior to conversion of the first terminal portion. In accordance with a presently preferred embodiment, the introducing means includes a mobile guide defining discrete first and second paths for the flow of desiccant and discrete first and second outlets for desiccant flowing along the respective paths. The aforementioned clamping units can be said to constitute a means for orienting the polygonal body relative to the introducing means so that the first and second outlets respectively register with and are closely adjacent the open ends of the first and second terminal portions of the polygonal body. The outlets are or can be disposed above the open ends of the respective terminal portions while the polygonal body is engaged by the orienting means so that desiccant can enter the terminal portions by gravity flow. As mentioned above, the orienting means can include at least one clamping unit with jaws engaging at least one terminal portion of the polygonal body. One of the aforementioned paths is preferably longer than the other path. The orienting means can maintain the polygonal body in or close to a vertical plane so that the terminal portions of the polygonal body slope downwardly from their open ends. The aforementioned paths can be disposed in the plane of the polygonal body.

The clamping units of the orienting means can be inclined relative to each other at an angle of substantially 90°, i.e., they can maintain the first and second terminal portions of the polygonal body at an angle of 90° during admission of desiccant and preparatory to conversion of first terminal portion into a substantially L-shaped frame member. When the conversion is completed, the first section of the substantially L-shaped frame member still extends at an angle of 90° to the second terminal portion, and the second section of such frame member is preferably aligned with the second terminal portion. The two clamping units can slope downwardly with reference to and can be disposed at opposite sides of a vertical plane which is located between the open ends of the two terminal portions. Each clamping unit can make with such vertical plane an angle of approximately 45°; this ensures that desiccant which is being admitted into the two terminal portions can flow at the same speed. The orientation of the polygonal body during admission of desiccant is preferably such that the path which is defined for the flow of desiccant into the open end of the second terminal portion is longer than the path which is defined for the flow of desiccant into the open end of the first terminal portion of the polygonal body.

The aforementioned guide which defines the two paths is preferably movable relative to the properly oriented polygonal body to and from an operative position in which its outlets register with the open ends of the two terminal portions. The paths which are defined by the guide receive metered quantities of desiccant in response to temporary opening of the aforementioned valves which are installed in conduits connecting a source of desiccant with the inlets of the guide. As mentioned above, admission of desiccant into the terminal portions of a properly oriented polygonal body is preferably regulated in such a way that only a part of each terminal portion is filled with desiccant.

The clamping unit for the second terminal portion of the properly oriented polygonal body is preferably movable in the longitudinal direction of the second terminal portion.

The means for establishing a seal between the open ends of the terminal portions upon completion of conversion of first terminal portion into a substantially L-shaped frame member can include a source of sealing elements (e.g., in the form of plugs) and a mobile arm or other suitable means for inserting a plug into the terminal portions upon completion of introduction of desiccant into the at least one terminal portion. Such inserting means can further comprise the aforementioned means for moving the second terminal portion longitudinally toward and away from the second section of the substantially L-shaped frame member so that the end portions of a plug which is held by the aforementioned arm in alignment with the second terminal portion and with the second section of the substantially L-shaped frame member are caused to penetrate into the respective open ends. The aforementioned source of the seal establishing means preferably comprises a supply of coherent plugs, and the seal establishing means then further comprises means (such as the aforementioned arm) for singularizing the plugs of the supply and for transporting discrete plugs toward the second terminal portion, namely into the space between the open end of the second terminal portion and the open end of the second section of the substantially L-shaped frame member. The source of the seal establishing means can further comprise an indexible-rotor (e.g., a rotary reel) and an elongated flexible carrier element (e.g., a belt or band) which is convoluted onto the rotor and supports the supply of plugs. The source of the seal establishing means can further comprise one or more spare rotors which are coaxial with the indexible rotor, and additional flexible carrier elements which are convoluted onto the spare rotors and carry additional supplies of plugs. The rotors are movable axially with reference to the converting and introducing means so as to place a selected rotor into a position for delivery of corresponding plugs to the sealing station.

The apparatus can further comprise one or more pivotable levers or other suitable means for triggering the operation of introducing and converting means in response to movement of the aforementioned guide to its operative position. The triggering means can further serve to initiate the movement of jaws or claws of the one or both clamping units into engagement with the respective terminal portion of the polygonal body.

In accordance with a presently preferred embodiment, the converting means further comprises an anvil which is adjacent one side of the first terminal portion of the properly oriented polygonal body, and means for bending the second section relative to the first section of the first terminal portion about the anvil. The bending means preferably includes a pivotable bending device and a deforming element (preferably a rolling element) at the other side of first terminal portion of the properly oriented polygonal body. The converting means further comprises means for moving the rolling element and the bending device relative to the anvil. The latter preferably includes an extension which extends close to the seal establishing means, preferably close to a.means for deforming the open ends of second terminal portion and second section of the substantially L-shaped frame member into sealing engagement with the respective end portions of a plug.

The apparatus can further comprise a mobile carriage and a turntable which is mounted on the carriage. The converting means is mounted on the turntable, and the carriage is preferably movable with reference to a support (such as a plate-like cheek or wall of a frame or housing) between a first position in which the converting means can accept a polygonal body and a second position in which the introducing means is operative to admit desiccant into the at least one terminal portion of the polygonal body.

The polygonal body can be made from an elongated hollow tubular blank which has two spaced-apart first walls and two sidewalls alternating with the first walls. The anvil of the converting means is adjacent the outer side of one of the first walls, and the rolling element of the converting means is adjacent the outer side of the other first wall of the first terminal portion when the polygonal body is properly oriented relative to the introducing means. The rolling element is disposed substantially opposite the anvil, and the converting means can further comprise means for reducing the distance between the anvil and the rolling element to thereby reduce the mutual spacing of the first walls in the region of the corner of the substantially L-shaped frame member. The anvil and the rolling element are disposed between the sidewalls of the adjacent part of the first terminal portion, i.e., of that part which is to form the corner of the substantially L-shaped frame member. The means for reducing the mutual spacing of the anvil and the rolling element can include means for effecting a movement of the first walls of the part of first terminal portion between the anvil and the rolling element into or close to actual contact with each other. The length of the anvil and of the rolling element can equal or approximate the distance between the two sidewalls of the first terminal portion minus 2m wherein m is the thickness of a first wall. The rolling element can constitute or resemble a roller having a substantially cylindrical central portion with an axial length at most equaling the distance of the two sidewalls from each other and an annular peripheral portion the axial length of which diminishes in a direction away from the axis of the roller and toward the anvil. The minimum axial length of the annular peripheral portion can be less than the distance of the two sidewalls from each other minus 2m.

The anvil is preferably formed with a protrusion or protuberance having a substantially convex peripheral surface which engages the first terminal portion of the properly oriented polygonal body during conversion of first terminal portion into the substantially L-shaped frame member. The means for moving the anvil is preferably designed to move the anvil toward the rolling element so as to provide the first terminal portion with a recess bounded by a concave surface which is complementary to the convex surface of the anvil. The anvil is preferably removable from the apparatus so that it can be replaced with a different anvil for the making of different spacer frames. The anvil is preferably immediately or closely adjacent the clamping unit for the first terminal portion of the polygonal body. As mentioned above, such clamping unit engages that part of the first terminal portion which is to constitute the first section of the substantially L-shaped frame member.

The extension of the anvil is preferably located opposite the bending device of the converting means and can be pivoted by such bending device during bending of second section of the developing substantially L-shaped frame member relative to the first section. The anvil and its extension are preferably pivotable with reference to the introducing means about a predetermined axis in response to bending of second section by the bending device. The means for moving the anvil toward the rolling element can be designed to advance the eccentric protrusion of the anvil to a position in which the respective first wall of the first terminal portion is adjacent the neutral line of the first terminal portion. Such eccentric protrusion, which extends to one side of the aforementioned extension of the anvil, penetrates into the adjacent part of the first terminal portion in response to pivoting of the anvil and its extension about the predetermined axis.

The apparatus can further comprise stops which are adjacent the outer sides of the sidewalls of that part of the first terminal portion which is being converted into the corner of the substantially L-shaped frame member to ensure that the mutual spacing of the sidewalls remains unchanged during deformation of the first walls by the eccentric protrusion of the anvil and by the rolling element of the converting means. One of the stops can include a portion of the aforementioned support or cheek for the carriage and its turntable. The other stop is preferably movable relative to the support so as to ensure that the apparatus can treat polygonal bodies which are made of different types of tubular blanks, namely blanks having sidewalls disposed at different distances from each other.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 8 is an enlarged view substantially as seen in the direction of arrow VIII in FIG. 5 and shows the one terminal portion in a sectional view, a rolling element of the converting means being shown in a starting position in which its peripheral surface is out of contact with the adjacent wall of the one terminal portion; and FIG. 9 shows the structure of FIG. 8 but with the rolling element and anvil in their final positions upon completion of conversion of a part of the one terminal portion into a corner of the substantially L-shaped frame member.

DESCRIPTION OF PREFERRED EMBODIMENTS

Figure 1:
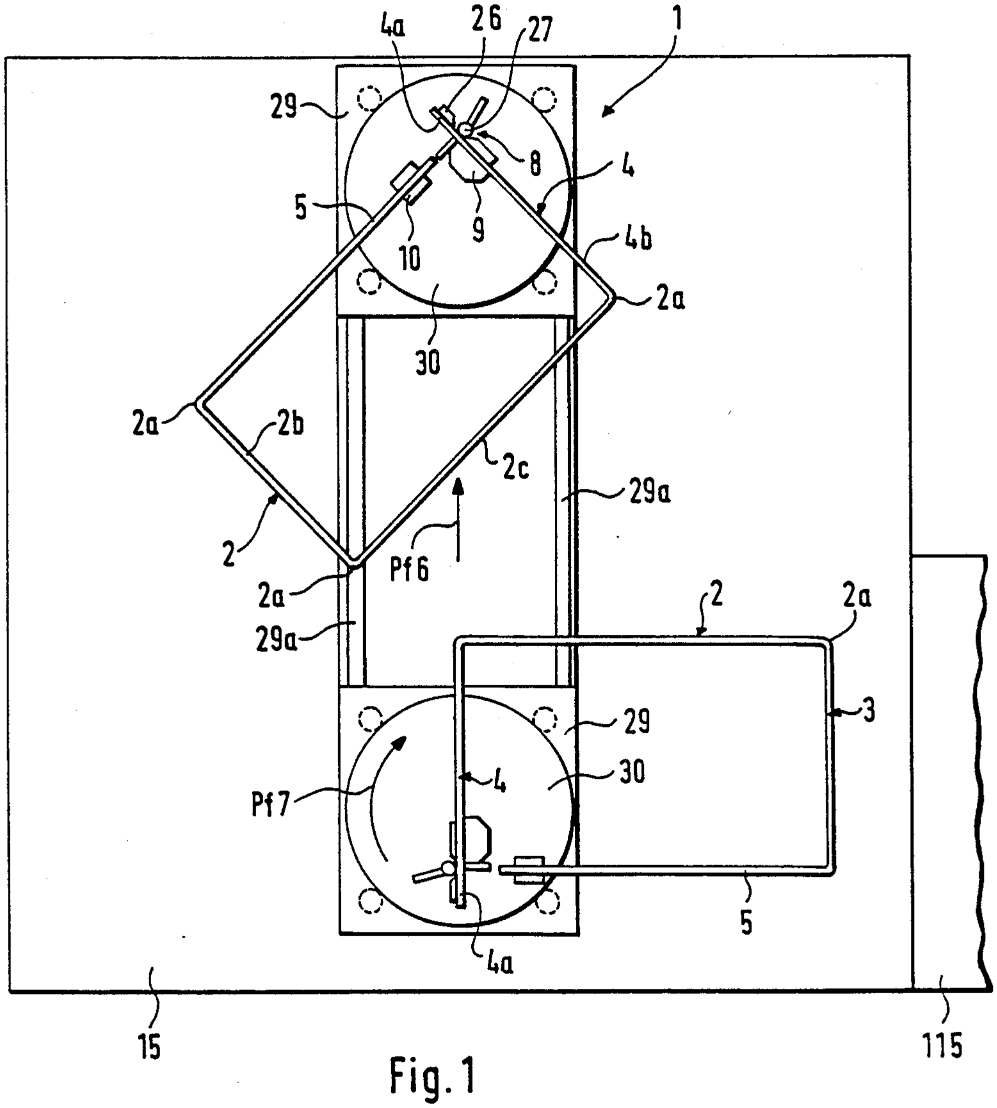
FIG. 1 is a front elevational view of an apparatus which embodies one form of the invention, a carriage for polygonal bodies being shown in a first position in which it can accept a polygonal body or in which it can support a tubular blank during conversion into a polygonal body, and a second position in which a polygonal body is properly oriented for reception of desiccant and for conversion of one of its terminal portions into a substantially L-shaped frame member.

Referring to FIG. 1, there is shown an apparatus 1 which is designed to make spacer frames for use between the panes of multiple-pane windows, e.g., windows of the type disclosed in commonly owned U.S. Pat. No. 4,720,950 to Bayer et al. The apparatus 1 comprises means for transforming an elongated hollow tubular blank 3 of ductile material (such as a metallic sheet material) into a polygonal body 2 which has three bends, elbows or corners *2a*, two straight intermediate frame members *2b*,*2c*, a first straight open-ended terminal portion 4 which extends from one of the corners *2a*, and a second straight open-ended terminal portion 5 which extends from another corner *2a*.

The apparatus 1 further comprises means 6 (FIG. 2) for introducing metered quantities of a flowable hygroscopic material or desiccant 7 into the open ends of the terminal portions 4, 5 so that such terminal portions are only partially filled with desiccant. When the introduction of metered quantities of desiccant 7 is completed, a converting device 8 is operated to convert the terminal portion 4 into a substantially L-shaped frame member including a first section *4b* which is adjacent the respective corner *2a*, a second section *4a* which is substantially or exactly aligned with the terminal portion 5, and a corner 2A (FIG. 5) which is disposed between the sections *4a*, *4b*. The details of a presently preferred converting device 8 are shown in FIGS. 5 to 9. The direction in which the converting device 8 bends the section *4a* relative to the section *4b* of the terminal portion 4 is indicated by arrow Pf1 (see FIGS. 2 and 5).

Figures 2, 3:
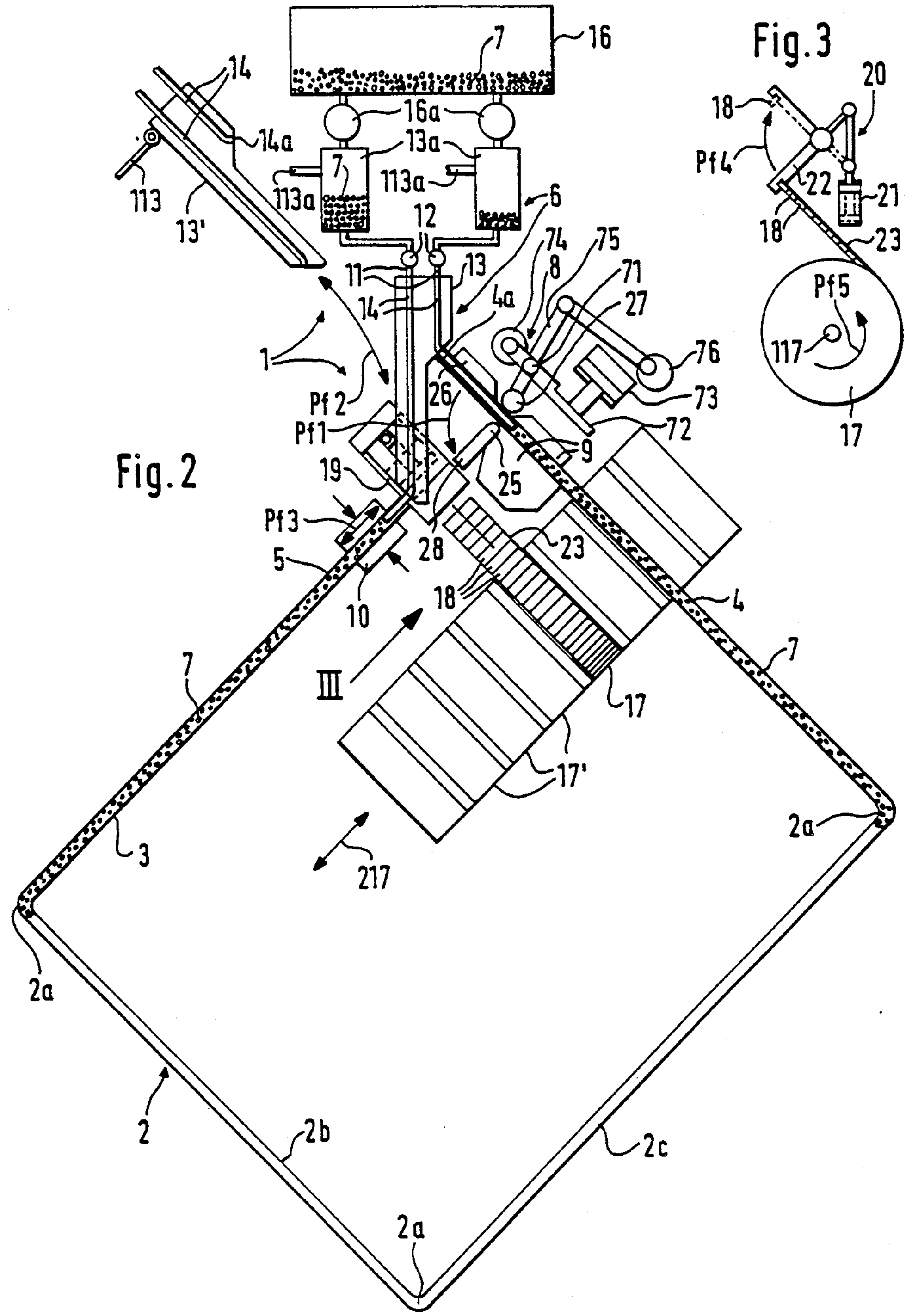
FIG. 2 is an enlarged partly sectional view of a properly oriented polygonal body, of the means for introducing metered quantities of desiccant, of the means for converting one terminal portion of the polygonal body into a substantially L-shaped frame member, and of the means for establishing a seal between such frame member and the other terminal portion of the polygonal body.
FIG. 3 is a view as seen in the direction of arrow III in FIG. 2, showing certain details of the means for establishing seals between L-shaped frame members and non-deformed terminal portions of successive polygonal bodies.
Figure 7:
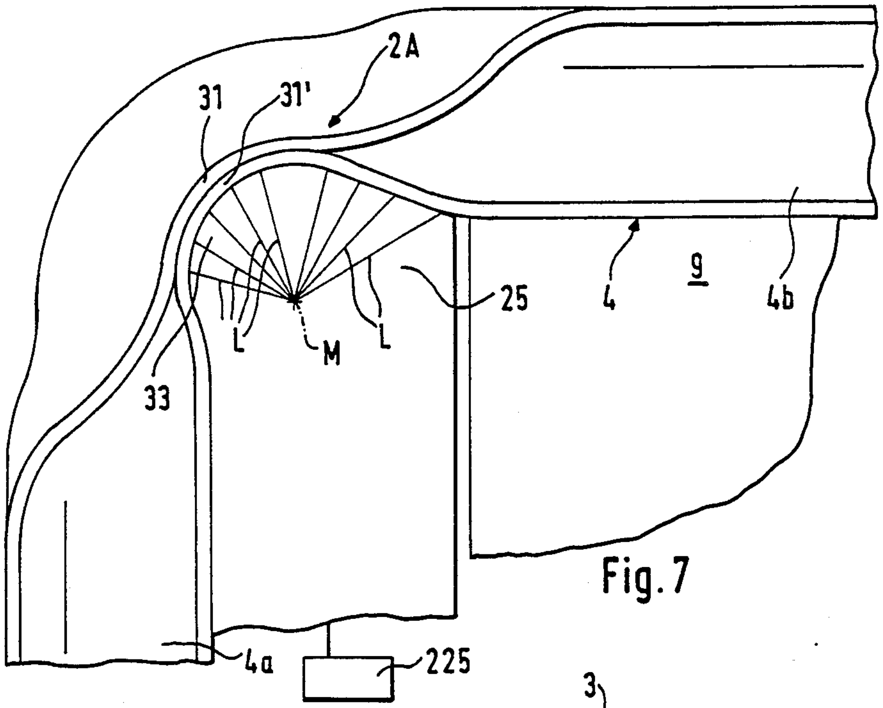
FIG. 7 shows the structure of FIG. 6 but with the anvil in its final position upon completion of conversion of the one terminal portion into a substantially L-shaped frame member.
Figure 6:
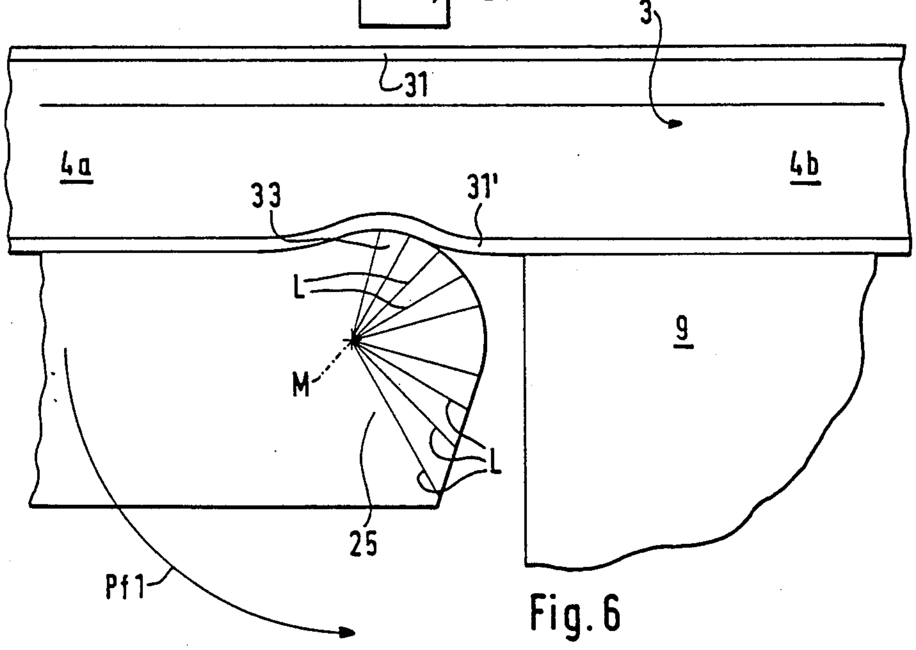
FIG. 6 is a greatly enlarged view of an anvil forming one constituent of the converting means, the anvil being shown in or close to its starting position.

The apparatus 1 further comprises means 20 (see FIG. 3) for establishing a seal between the terminal portion 5 and the section *4a* of the L-shaped frame member ***4a*+*4b*+2A so as to confine the admitted desiccant 7 and to complete the transformation of a tubular blank 3** into a rectangular spacer frame which is ready for introduction between two panes of a multiple-pane window, such as the panes shown in FIGS. 3 and 7 of U.S. Pat. No. 4,720,950.

The length of the terminal portion 5 is selected in such a way that the terminal portion 5 and the section *4a* of the terminal portion 4 jointly form a frame member having a length matching that of the intermediate frame member *2c*. At such time, i.e., upon completion of the converting operation, the length of the section *4b* of the terminal portion 4 matches the length of the frame member *2b* (it is assumed here that the apparatus 1 is designed for the making of rectangular spacer frames each having two longer frame members of identical length and two shorter frame members of identical length). However, the improved apparatus 1 can be readily converted for the making of otherwise configurated (e.g., trapezoidal, square and/or other) spacer frames without departing from the spirit of the invention.

The apparatus 1 further comprises means for orienting the polygonal body 2 relative to the introducing means 6, converting device 8 and seal establishing means 20 so that the polygonal body 2 is located in or close to a vertical plane and the open ends of terminal portions 4, 5 are adjacent a pivotable guide 13. This guide forms part of the introducing means 6 and has two grooves, channels, pipes or like parts 14 one of which defines a relatively short path for admission of a metered quantity of desiccant 7 into the terminal portion 4 and the other of which defines a relatively long path for admission of desiccant 7 into the terminal portion 5 of the polygonal body 2. The converting device 8 is immediately or closely adjacent the introducing means 6; this ensures that the orientation of the polygonal body 2 can remain unchanged when the admission of metered quantities of desiccant 7 is completed and the converting device 8 must be actuated to transform the terminal portion 4 into the aforementioned L-shaped frame member having a first section 4b, a second section 4a extending substantially at right angles to the section 4b and being in substantial or exact alignment with the terminal portion 5, and a corner 2A.

The orienting means of the apparatus 1 can form part of the converting device 8 and includes a first clamping unit 9 having two jaws or claws which can releasably engage and temporarily hold that part of the terminal portion 4 which constitutes the section 4b when the converting step is completed, and a second clamping unit 10 having two jaws or claws 10a (FIG. 4) which releasably engage and temporarily hold the terminal portion 5 during introduction of a metered quantity of desiccant 7 as well as during subsequent conversion of terminal portion 4 into an L-shaped frame member and during next-following actuation of the seal establishing means 20.

The mobile guide 13 of the introducing means 6 has two outlets 14a (see particularly FIG. 4), one at the discharge end of each of the aforementioned channels, pipes or grooves 14 (hereinafter called channels) for admission of a metered quantity of desiccant 7 into the respective terminal portion 4 or 5. The clamping units 9, 10 of the means for orienting the polygonal body 2 are designed to maintain the terminal portions 4, 5 in such positions that the open end of the terminal portion 4 is adjacent the outlet 14a of the shorter channel 14 and the open end of the terminal portion 5 is adjacent the outlet 14a of the longer channel 14 in the guide 13. The terminal portion 4 slopes downwardly from the respective outlet 14a at an angle which ensures that a stream of desiccant 7 can flow toward the respective corner 2a under the action of gravity, and the same holds true for downward inclination of the terminal portion 5 from the respective outlet 14a of the guide 13.

Figure 4:
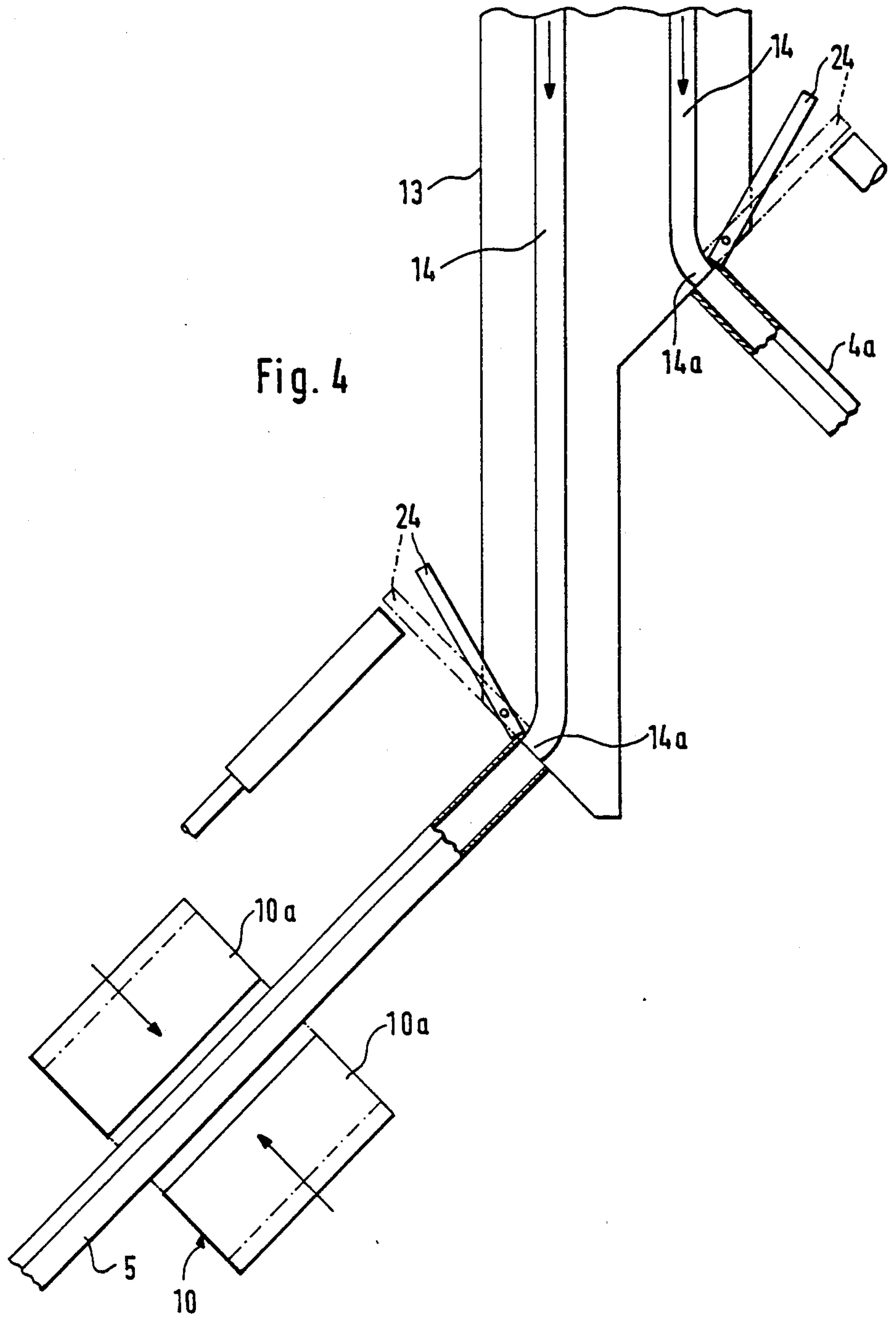
FIG. 4 is a greatly enlarged view of another detail in the structure of FIG. 2, showing one of the clamping units and a portion of a guide which admits metered quantities of desiccant into the terminal portions of a polygonal body at the converting station, and further showing means for triggering a sequence of operations in response to proper positioning of the guide with reference to the terminal portions of a polygonal body.

FIG. 2 shows that the introducing means 6 comprises a magazine 16 or another suitable replenishable source of desiccant 7, two vessels 13a which can receive desiccant from the magazine 16 in response to opening of corresponding shutoff valves 16a, and metering valves 12 in conduits 11 which connect the vessels 13a with the inlets of the respective channels 14 in the guide 13. The vessels 13a preferably constitute plenum chambers wherein the desiccant 7 is acted upon by compressed air or another pressurized gaseous fluid so that, when the valves 12 are opened, metered quantities of desiccant are pneumatically conveyed into the respective channels 14 to flow along the corresponding paths through and beyond the outlets 14a and into the terminal portions 4, 5 of the polygonal body 2 which is being oriented by the jaws or claws of the clamping units 9 and 10. FIGS. 2 and 4 show a first guide 13 in operative position, and FIG. 2 shows a spare or second guide 13' in an inoperative position. As mentioned above, the length of one of the channels 14 exceeds the length of the other channel 14 in order to ensure that each of the two outlets 14a will be immediately adjacent the open end of the respective terminal portion 4, 5 when the polygonal body 2 is properly oriented by the clamping units 9, 10 and the valves 12 are ready to admit metered quantities of desiccant 7 which flows through the corresponding conduits 11 of the introducing means 6 and into the channels 14 of the guide 13. The setting of the metering valves 12 depends upon the desired length of those parts of the terminal portions 4, 5 which are to receive a flowable desiccant and on the cross-sectional areas of internal spaces of the terminal portions.

The illustrated clamping units 9 and 10 are designed to maintain the polygonal body 2 in an orientation such that the terminal portions 4, 5 slope downwardly at angles of approximately 45° from opposite sides of a vertical plane which is normal to the plane of FIG. 2 and is located between the terminal portions 4 and 5. The outlets 14a of the guide 13 are curved so as to ensure predictable and practically unobstructed flow of desiccant 7 from the substantially vertical channels 14 of the guide (namely of the guide 13 which is maintained in the operative position shown in FIG. 4) into the downwardly sloping internal spaces of the terminal portions 4 and 5. FIG. 1 shows that the clamping devices 9, 10 of orienting means for the polygonal body 2, the introducing means 6 for desiccant 7, the converting device 8, and the seal establishing means 20 are mounted on an upright plate-like wall or cheek 15 of the apparatus 1. The cheek 15 can be inclined to the vertical so that one side of the polygonal body 2 rests on the respective side of the cheek 15 during admission of desiccant, during conversion of the terminal portion 4 into a substantially L-shaped frame member, and during the establishment of a seal between the open end of the terminal portion 5 and the open end of section 4a of the L-shaped frame member.

The metering action of valves 12 is preferably selected in such a way that the shorter channel 14 of the guide 13 admits desiccant 7 only into that part of the terminal portion 4 which is to form the section 4b of the L-shaped frame member, and that the longer channel 14 of the guide 13 admits desiccant only into the lower part of the terminal portion 5. This ensures that desiccant 7 cannot be spilled during conversion of the terminal portion 4 into an L-shaped frame member, and that the open end of the terminal portion 5 can receive a portion of a sealing element in the form of a plug 18 which is introduced by the seal establishing means 20 upon completion of the converting step. During admission of desiccant, the open end of the terminal portion 5 is located at a level below that part of the terminal portion 4 which is converted into the second section 4a of the L-shaped frame member. It is presently preferred to select the inclination of terminal portions 4, 5 in such a way that each thereof slopes downwardly at an angle of approximately 45° to the vertical; this ensures a highly predictable flow of metered quantities of desiccant 7 into the terminal portions, either by gravity feed alone or by gravity flow as well as under the action of a pressurized gaseous fluid which can be admitted into the vessels 13a via conduits 113a.

The directions in which the guide 13 is movable (particularly pivotable) to and from the operative position of FIGS. 2 and 4 are indicated by a double-headed arrow Pf2. Such movability of the guide 13 is advisable and actually necessary in order to ensure that the guide cannot interfere with conversion of the terminal portion 4 into an L-shaped frame member and also that the guide 13 cannot interfere with the sealing of open ends of the terminal portion 5 and section 4a. When moved to its inoperative position, the guide 13 can assume a position close to or matching that of the spare guide 13′ shown in FIG. 2. The means for moving the guide 13 to and from its operative position can include a suitable linkage one element of which is shown at 113.

FIG. 2 shows the polygonal body 2 upon completion of the desiccant-introducing step. It will be noted that desiccant fills a substantial part of the terminal portion 4 but not that part which is about to be converted into the section 4a of the L-shaped frame member, and that desiccant fills a substantial part of the terminal portion 5 but the region immediately beneath the open end of terminal portion 5 is empty so that the topmost part of the terminal portion 5 can receive a portion of a plug 18. The distance between the levels of the uppermost and lowermost parts of the desiccant-containing region of terminal portion 4 is less than the overall length of the terminal portion 4, and the same holds true for the terminal portion 5. The just described mode of selecting metered quantities of desiccant 7 which are to be admitted into the terminal portions 4 and 5 ensures that desiccant does not interfere with bending of the terminal portion 4 (in order to form the sections 4a, 4b and the corner 2A), and also that desiccant cannot interfere with proper sealing of open ends of the section 4a and terminal portion 5.

Certain details of the seal establishing means 20 are shown in FIGS. 2 and 3. The means 20 is adjacent the guide 13 when the latter assumes its operative position, and the means 20 is also adjacent the converting device 8. The illustrated seal establishing means 20 comprises at least one source of plugs 18, and such source comprises an indexible rotor 17 in the form of a reel for a convoluted flexible element in the form of a band 23 which carries a battery of neighboring plugs 18. Still further, the seal establishing means 20 comprises a device 19 which deforms the open end of the terminal portion 5 and the open end of the section 4a when the converting step is completed so that a plug 18 which already extends into the open end of the terminal portion 5 and into the open end of the section 4a can form a reliable seal in the frame member including the terminal portion 5 and section 4a. The device 19 includes means for deforming the open ends of the terminal portion 5 and section 4a so as to ensure that the respective ends of the plug 18 are sealingly confined in the corresponding open ends. The operation of the seal establishing means 20 is preferably automated, the same as that of the means (including the linkage 113) for moving the guide 13 to and from its operative position, of the introducing means 6, of the converting device 8 and of the means for opening and closing the jaws or claws of the clamping units 9 and 10.

The seal establishing means 20 further comprises a combined singularizing and transferring device for discrete plugs 18, and such singularizing device comprises an arm 22 which is movable by a fluid-operated motor 21 to engage the foremost plug 18 on the band 23 and deliver it into register with the open end of the terminal portion 5. The direction in which the arm 22 can transfer a singularized plug 18 is indicated by arrow Pf4 (see FIG. 3). The thus transferred plug 18 is then in the range of the device 19 which completes the sealing operation as soon as the plug extends into the open ends of the terminal portion 5 and section 4a. The source including the reel 17 and the convoluted band 23 is located at a level beneath that of the deforming device 19.

The band 23 can be coated with a layer of suitable adhesive which attracts the plugs 18 and maintains them in requisite positions for engagement by the arm 22 preparatory to transfer of successive foremost plugs 18 to the sealing station. The means for indexing the rotor or reel 17 in the direction of arrow Pf5 (FIG. 3) comprises a shaft 117 which is rotated by a stepping motor or the like, not shown.

The apparatus 1 can store one or more spare reels 17′ with convoluted bands 23 for supplies of plugs 18, and means for moving the reels 17, 17′ axially (such moving means is indicated by a double-headed arrow 217) so as to move an empty reel 17 or 17′ out of the way or to move a selected spare reel 17′ (e.g., a spare reel carrying a battery of differently dimensioned and/or configurated plugs 18) into the range of the arm 22.

Plugs which can be used to seal open ends of terminal portions of spacer frames are disclosed in commonly owned U.S. Pat. No. 4,608,802 to Bayer.

The arrow Pf3 denotes in FIG. 2 a device (e.g., a fluid-operated cylinder and piston unit) which can move the clamping unit 10 in the longitudinal direction of the terminal portion 5 when the converting step is completed and when the open end of the terminal portion 5 registers with a plug 18 so that the end portions of plug can be inserted into the open end of the terminal portion 5 and into the open end of the freshly formed section 4a preparatory to actuation of the deforming device 19 which completes the sealing operation. The moving device denoted by the arrow Pf3) further serves as a means for keeping the terminal portion 5 at a required distance from the terminal portion 4 during conversion of terminal portion 4 into an L-shaped frame member as well as during introduction (by the arm 22) of a plug 18 between the open ends of the terminal portion 5 and section 4a so that the end portions of the thus positioned plug 18 can automatically penetrate into the terminal portion 5 and into the section 4a when the clamping unit 10 is caused to move upwardly toward the clamping unit 9 (the jaws of which then engage and hold the section 4b adjacent the corner 2A).

It will be noted that the clamping unit 10 performs several functions including that of properly orienting the terminal portion 5 and the entire polygonal body 2 during introduction of desiccant 7 and during conversion of terminal portion 4 into an L-shaped frame member, and that of inducing the end portions of a plug 18 to penetrate into the open ends of the terminal portion 5 and section 4a. It can be said that the clamping units 9 and 10 constitute an orienting means which maintains the polygonal body 2 in suspended position during completion of the operation which involves transformation of the blank 3 into a polygonal spacer frame.

FIG. 4 shows levers 24 which constitute a means for triggering the operation of device indicated by double-headed arrow Pf3 to engage the jaws or claws 10a of the clamping unit 10 with the adjacent part of the terminal portion 5 at the exact instant when the outlets 14a of the guide 13 (in the operative position of such guide) are engaged by the open ends of the terminal portions 4 and 5. Once the outlets 14a are engaged by the open ends of the terminal portions 4 and 5, the levers 24 are moved from the solid-line positions to the phantom-line positions of FIG. 4 to thereby trigger a sequence of steps including closing of the jaws or claws 10a around the terminal portion 5, closing of the jaws or claws of the clamping unit 9 around the terminal portion 4, opening of the valves 12 to admit metered quantities of desiccant 7, closing of the valves 12, actuation of the converting device 8 to transform the terminal portion 4 into an L-shaped frame member including the sections 4*a*, 4*b* and the corner 2A, moving the clamping unit 10 upwardly toward the clamping unit 9 (upon completed transfer of a plug 8 between the open end of the terminal portion 5 and the open end of the section 4*a*), and actuation of the deforming device 19 in order to ensure the establishment of a reliable seal between the end portions of the plug 18 on the one hand, and the terminal portion 5 and section 4*a* on the other hand. Still further, the sequence of steps which are triggered as a result of pivoting of the levers 24 from the solid-line positions to the phantom-line positions of FIG. 4 can include disengagement of the clamping units 9 and 10 from the finished spacer frame so that the latter can be withdrawn from the apparatus 1, either by hand or by a suitable conveyor system, not shown.

The converting device 8 constitutes a very important element of the apparatus 1. The illustrated converting device includes an anvil or back support 25 which is disposed beneath a properly oriented terminal portion 4 at the locus of the corner 2A of the L-shaped frame member. The anvil or back support 25 cooperates with a bending or flexing device 26 which is located opposite the anvil 25 and can perform a controlled movement so as to flex the section 4*a* relative to the section 4*b* and to thus form the corner 2A while simultaneously aligning the section 4*a* with the terminal portion 5. The section 4*a* is bent downwardly so that its open end confronts the open end of the terminal portion 5 when the converting operation is completed. The converting device 8 still further comprises a roller-shaped deforming or rolling element 27 which assists the bending device 26 to impart to the corner 2A a predetermined shape in cooperation with the anvil 25. The rolling element 27 is arranged to roll longitudinally of the terminal portion 4 relative to the adjacent partly cylindrical portion of the anvil 25.

Figure 5:
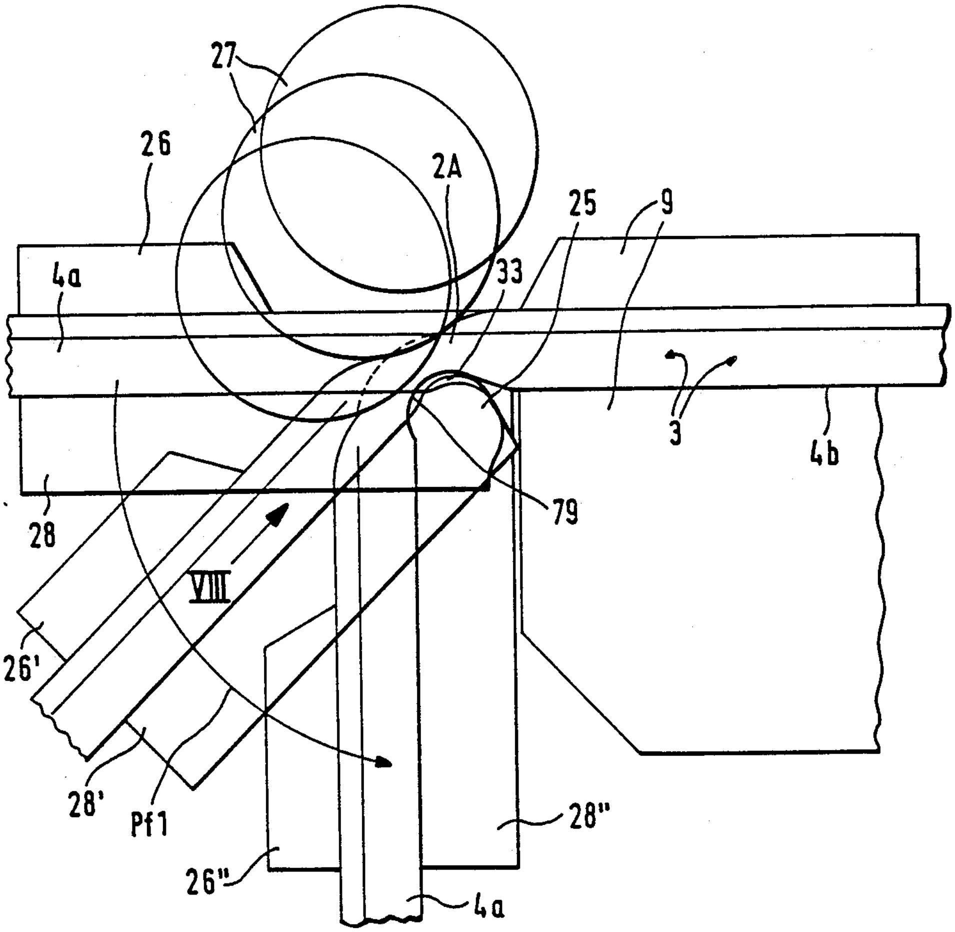
FIG. 5 is an enlarged view of one terminal portion of a polygonal body and of the constituents of means for converting such terminal portion into a substantially L-shaped frame member, the constituents being shown in their starting, intermediate and final positions and in orientations different from those shown in FIG. 2.

The anvil 25 includes an extension 28 which is substantially or exactly parallel to the terminal portion 5 and can serve as a stop for the section 4*a*, e.g., the section 4*a* can come into abutment with the extension 28 when the bending of the terminal portion 4 is completed and the open end of the section 4*a* is in an optimum position for reception of one end portion of a plug 18 which has been delivered and is still held by the arm 22 of the seal establishing means 20 between the open ends of the terminal portion 5 and section 4*a*. The lower end portion of the extension 28 preferably extends to a level close to the deforming device 19 of the seal establishing means 20. As can be seen in FIG. 5, the extension 28 of the anvil 25 can cooperate with the bending device 26 to ensure that the section 4*a* of a freshly formed L-shaped frame member is properly oriented with reference to the terminal portion 5 as soon as the converting operation is completed. FIG. 5 shows the bending device 26 in a starting position of alignment with the jaws or claws of the clamping unit 9, in an intermediate position 26′, and in an end position 26″ upon completion of the converting operation, i.e., when the section 4*a* is held between the extension 28 (in the position 28″) of the anvil 25 and the bending device 26 (in the position 26″). An intermediate position of the extension 28 is shown at 28′.

FIG. 1 shows that the converting device 8 and the clamping units 9 and 10 are mounted on a slide or carriage 29 which is movable along tracks 29*a* provided on the cheek 15. The carriage 29 includes a turntable 30 which can change the orientation of the polygonal body 2 relative to the carriage 29 and cheek 15, either during or prior to movement of the carriage 29 from the position which is shown in the lower part of FIG. 1 to the position at the upper end of the cheek 15.

The arrangement is preferably such that the carriage 29 accepts a polygonal body 2 while it dwells in the lower end position of FIG. 1, and the carriage 29 is thereupon moved in the direction of arrow Pf6 while the turntable 30 performs an angular movement in the direction of arrow Pf7 so as to ensure that the clamping units 9 and 10 can properly orient the polygonal body 2 as soon as the carriage 29 reaches its upper end position. The carriage 29 can receive successive polygonal bodies by hand or from a suitable conveyor system, not shown in the drawing.

The converting device 8 shares the movements of the carriage 29 and can also serve as a means for transforming a blank 3 into a polygonal body 2 while the carriage 29 dwells in the lower end position of FIG. 1. Alternatively, the apparatus 1 can comprise a discrete transforming means 115 which is provided on or adjacent the cheek 15 next to the lower end portions of tracks 29*a* to convert successive blanks 3 into discrete polygonal bodies 2 while the carriage 29 dwells in the upper end position of FIG. 1, namely while a polygonal body 2 is being transformed into a spacer frame. The provision of a discrete transforming means 115 is preferred at this time because this enhances the output of the apparatus 1, i.e., a profiled body 2 is in the process of being formed while the preceding profiled body 2 is in the process of being transformed into a spacer frame.

It has been found that a metered quantity of desiccant 7 in the terminal portion 4 and/or 5 of a profiled body 2 suffices to prevent fogging of the panes in a multiple-pane window, i.e., that it is not necessary to admit desiccant into the frame members 2*b* and 2*c*. In fact, it normally suffices to admit desiccant into the terminal portion 4 or 5, or to partially fill the portions 4 and 5 with predetermined (metered) quantities of desiccant.

An important advantage of the apparatus 1 is that the making of corners 2*a* and 2A can take place while the corresponding parts of the blank 3 and profiled body 2 are devoid of desiccant. This renders it possible to impart to each of the corners 2*a*, 2A a predetermined size and shape.

Another important advantage of the apparatus 1 is that the terminal portions 4 and 5 of a polygonal body 2 extend downwardly from their respective open ends in the course of the desiccant-introducing operation. This not only enables the desiccant to flow by gravity but also reduces the likelihood, or eliminates the possibility, of leakage of desiccant during admission into the terminal portions 4 and 5. All this is achieved by the simple expedient of suspending the profiled body 2 in the carriage 29 during introduction of desiccant 7, during conversion of terminal portion 4 into an L-shaped frame member, and during subsequent sealing of the open ends of terminal portion 5 and section 4*a*. In order to ensure a highly predictable orientation of a polygonal body 2 in the course of the desiccant-introducing, converting and seal-establishing operations, one side of the body 2 preferably lies against the cheek 15 so as to ensure that the body 2 will be maintained in a predetermined plane as well as that the terminal portions 4, 5 will slope downwardly at angles of 45° with reference to a vertical plane which extends between the open ends of the terminal portion 5 and section 4*a* and is disposed at right angles to the plane of FIG. 1. The just discussed inclination of terminal portions 4, 5 with reference to the vertical plane normally suffices to ensure a predictable and rapid admission of metered quantities of desiccant 7, even if the pneumatic admitting means (including the conduits 113*a*) is out of commission, i.e., if the metered quantities of desiccant are admitted exclusively by gravity flow.

Filling of selected parts of terminal portions 4 and 5 with desiccant 7 is desirable and advantageous because the introduced desiccant does not interfere with predictable deformation of the terminal portion 4 in order to form the sections 4*a*, 4*b* and the corner 2A, and desiccant in the terminal portion 5 cannot prevent predictable introduction of the lower end portion of a plug 18 into the open end of the terminal portion 5 while the clamping unit 10 is caused to move upwardly closer to the clamping unit 9.

The converting device 8 which is shown in detail in FIGS. 5 to 9 is analogous to or identical with the converting device of the type described and claimed in commonly owned copending patent application for "Apparatus for converting tubular blanks into spacer frames of multiple-pane windows". It comprises the aforementioned anvil 25, the extension 28 of the anvil 25, the bending device 26, the rolling element 27, and suitable means (FIG. 2) for moving the bending device 26 and rolling element 27 relative to each other and relative to the anvil 25. The arrangement is such that, during conversion of terminal portion 4 into a substantially L-shaped frame member, the distance between the rolling element 27 and anvil 25 is at least slightly less than the distance between the walls 31, 31' of the terminal portion 4. This can be readily seen in FIGS. 5–7 and 9. In other words, the distance between the walls 31, 31' is reduced in that the median portion of the wall 31' is moved (by the anvil 25) toward the median portion of the wall 31, and the rolling element 27 moves the median portion 31*a* of the wall 31 toward the median portion of the wall 31'. As can be seen in FIGS. 7 and 9, the median portions of the walls 31, 31' can be moved into actual contact with each other. This is possible because the corresponding part of the internal space of the hollow tubular section 4 does not contain any desiccant 7, i.e., the desiccant cannot interfere with such (pronounced) deformation of the walls 31 and 31' that the median portions of these walls actually touch each other in the region of the corner 2A. The anvil 25 cooperates with the rolling element 27 to move the median portions of the walls 31, 31' relative to the marginal portions of these walls as hence relative to the sidewalls 32, 32' of the terminal portion 4 between the sections 4*a* and 4*b*. The sidewalls 32, 32' are spaced apart from and parallel to each other, not only prior to but also upon completion of conversion of terminal portion 4 into a substantially L-shaped frame member. Absence of desiccant 7 in the space between the anvil 25 and rolling element 27 greatly reduces and practically eliminates the likelihood of making unsatisfactory L-shaped frame members, i.e., of making spacer frames which must be discarded because their appearance and/or other characteristics fail to meet the prescribed standards.

As can be seen in FIGS. 8 and 9, the axial length of the partly cylindrical portion of the anvil 25 at most matches but is actually less than the distance between the sidewalls 32, 32' of the terminal portion 4, and the axial length of the rolling element 27 is also less than (or at most matches) the distance between the sidewalls 32, 32'. This renders it possible to deform the median portions of the walls 31, 31' in such a way that their median portions move very close to or actually contact each other while the configuration, orientation and mutual spacing of sidewalls 32, 32' remain at least substantially unchanged. This greatly reduces the likelihood of the making of defective spacer frames in spite of the fact that the interior of that part of each polygonal body 2 which is to be converted into a corner 2A is not filled with desiccant. In the embodiment of FIGS. 5 to 9, the axial length of the cylindrical or substantially cylindrical portion of the anvil 25 and the axial length of the rolling element 27 are selected in such a way that they equal or approximate the distance between the sidewalls 32, 32' minus at least two thicknesses of the wall 31 or 31'. This renders it possible to impart to the intermediate part of terminal portion 4 a substantially I-shaped profile which is shown in FIG. 9 and wherein both legs of the I (these legs include the sidewalls 32, 32') are hollow (because the axial length of the anvil 25 and the axial length of the rolling element 27 are less than the distance between the sidewalls 32, 32' minus 2m wherein m is the thickness of the wall 31 or 31' (i.e., the wall thickness of the terminal portion 4).

FIGS. 8 and 9 further show that the peripheral portion 127 of the rolling element 27 resembles an annulus having an axial length which decreases gradually in a direction away from the axis of the rolling element 27. Thus, the peripheral portion 127 has a substantially trapezoidal crosssectional outline which ensures that the deformed part of the terminal portion 4 has a profile with two mutually inclined panels 31*b* forming part of the deformed wall 31. The maximum axial length of the rolling element 27 (radially inwardly of the annular portion 127) can approximate the distance between the sidewalls 32, 32' of the terminal portion 4 (i.e., between the sidewalls of the blank 3). The minimum axial length of the annular peripheral portion 127 determines the width of the median portion 31*a* of the wall 31, namely of that median portion which is moved close to or into actual abutment with the median portion of the wall 31'. The illustrated partly rectangular and partly trapeziform crosssectional outline of the underformed blank 3 has been found to be particularly suitable for conversion of a part of terminal portion 4 into a profile of the type shown in FIG. 9, namely into the shape of a partially hollow I in the region of the corner 2A. Such configuration of the blank 3 ensures that the corner 2A can be formed within a short interval of time and without risking a cracking or bursting of terminal portion 4 in the region which is to constitute the corner 2A.

The peripheral surface of the anvil 25 matches or closely approximates the desired shape of the inner (concave) side of the corner 2A. The arrangement is preferably such that the anvil 25 is movable relative to the terminal portion 4 during conversion of this terminal portion into a substantially L-shaped frame member, at least during a certain stage of the converting operation, so that the anvil extends inwardly (upwardly in FIGS. 1, 2, 5 and 7) beyond the major part of the wall 31'. This ensures that the wall 31' is formed with a recess or socket 79 in the region of the developing corner 2A. Moreover, this enables the converting device 8 to move the median portion of the wall 31' into actual contact with the deformed or displaced median portion 31*a* of the wall 31. Such extensive deformation of the terminal portion 4 in the region of the developing corner 2A is made possible because the constituents of the converting device 8 are designed to move the median portion 31*a* of the wall 31 toward the wall 31' while the median portion of the wall 31' moves toward the median portion 31*a* of the wall 31. Moreover, such deformation of the walls 31, 31' is possible without any, or without undue, deformation of the sidewalls 32 and 32'.

The apparatus 1 can be furnished with one or more spare rolling elements 27 and with one or more spare anvils 25 so that one and the same apparatus can effectively form spacer frames from different types of hollow tubular blanks 3, i.e., from blanks wherein the sidewalls 32, 32' are disposed at different distances from each other.

In order to further enhance the predictability of the converting operation, the rolling element 27 is preferably installed in immediate or close proximity to the jaws or claws of the clamping unit 9. This can be readily seen in FIG. 2 which further shows the mechanism for moving the rolling element 27 relative to the anvil 25 and for moving the bending device 26 in the direction of arrow Pf1, i.e., toward the extension 28 of the anvil 25. The latter is immediately or closely adjacent the lower jaw or claw of the clamping unit 9. The arrangement is preferably such that the anvil 25 is turned about the axis of its cylindrical portion, together with the extension 28, from the position of FIG. 6 to the position of FIG. 7 while the rolling element 27 rolls along the upper side of adjacent part of the terminal portion 4 and while the bending member 26 changes the inclination of the section 4*a* relative to the section 4*b* of the developing substantially L-shaped frame member (converted terminal portion 4). Springs or the like (not shown) can be used to permanently bias the anvil 25 and extension 28 to the starting positions of FIG. 6. The mechanism 225 which turns the anvil 25 and moves it toward the rolling element 27 in the course of a converting operation can be designed in such a way that the peripheral surface of the anvil gradually rises all the way to the neutral line of the respective portion of the blank 3. This mechanism 225 can be designed to turn the anvil about an axis M (FIGS. 6 and 7) which is not the axis of the cylindrical or substantially cylindrical portion 33 of the anvil so that the peripheral surface of the anvil automatically penetrates into the wall 31' (see FIGS. 6 and 7) when the anvil is turned from the position of FIG. 6 to the position of FIG. 7 (note the arrow Pf1 in FIG. 6). The distance L of the axis M from successive portions of peripheral surface of the anvil 25 increases gradually in a clockwise direction (as viewed in FIGS. 6 and 7) to thus ensure that the inner side of the developing corner 2A is bounded by a concave surface including the outer side of the deformed median portion 31*a* of the wall 31 and the outer sides of the inclined wall portions 31*b* (see FIG. 9). The protruding portion 33 of the turning anvil 25 actually stretches the material of the engaged portion of the wall 31.

FIGS. 8 and 9 further show that the converting device 8 comprises plate-like abutments or stops for the outer sides of sidewalls 32 of the terminal portion 4, at least in the region where the terminal portion 4 is to develop the corner 2A. One of these stops can include the respective portion of the cheek 15, and the other of these stops can include a platen 34 which is spaced apart from and is parallel or nearly parallel to the cheek 15. If the polygonal body 2 does not directly abut the cheek 15, the converting device 8 will be provided with two discrete platens 34, one at the outer side of each of the two sidewalls 32, 32'. The platen 34 of FIGS. 8 and 9 is preferably adjustable with reference to the other platen (cheek 15) in directions indicated by double-headed arrow Pf9) so as to ensure that the person in charge or an automatic programming unit can select the distance between the sidewalls 32, 32' in the region of the corner 2A as well as that the apparatus 1 can properly treat blanks 3 having sidewalls 32, 32' disposed at different distances from each other. For example, the platen 34 can be provided with several brackets which can be secured to the cheek 15 in such a way that the properly affixed platen 34 is located at any one of two or more different distances from the cheek 15.

The mechanism (see FIG. 2) for moving the rolling element 27 and bending device 26 relative to the section 4*b* of the terminal portion 4 (i.e., relative to that part of the terminal portion 4 which is converted into the section 4*b* of the resulting substantially L-shaped frame member) includes a shaft 71 which is mounted on the turntable 30, a two-armed lever 72 which can be rocked about the axis of the shaft 71 by a double-acting fluidoperated motor 73, a roller 74 mounted on the free end portion of the left-hand arm of the lever 72 and movable into and from engagement with the pivotable bending device 26, a second lever 75 which is also rockable about the axis of the shaft 71 and carries the rolling element 27, and an eccentric drive 76 which can rock the lever 75. The illustrated mechanism constitutes but one of many suitable means for moving the rolling element 27 and bending device 26 in order to convert the terminal portion 4 into a substantially L-shaped frame member.

The improved method and apparatus exhibit the advantage that the locus where the spacer frame is sealed (namely where the open end of the terminal portion 5 abuts the open end of the section 4*a*) is spaced apart from the corners 2*a*, 2A so as to simplify the sealing operation and to reduce the likelihood of uncontrolled leakage of desiccant. Moreover, the desiccant cannot adversely influence the making of the corner 2A because the corresponding part of the terminal portion 4 is devoid of desiccant. All such advantages are achieved by the novel expedient of only partially filling the terminal portion 4 and/or 5 with desiccant and of making the last corner 2A subsequent to admission of desiccant at a location wherein the interior of the polygonal body 2 does not contain any desiccant.

It goes without saying that, if desired, the improved method and apparatus can be designed to ensure that the frame member 2*b* and/or 2*c* of the finished spacer frame also contains at least some desiccant. This can be readily achieved by forming at least two of the three corners 2*a* in such a way that these corners define passages or paths for the flow of desiccant from the terminal portion 41 into the interior of the frame member 2*b* and/or 2*c*, and/or that these corners permit desiccant to flow from the terminal portion 5 into the frame member 2*c* and/or 2*b*. Thus, it is equally within the purview of the invention to fill or partially fill more than two frame members of the finished spacer frame with a flowable hygroscopic material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of making a spacer frame for use between the panes of a multiple-pane window, comprising the steps of transforming an elongated hollow tubular blank of ductile material into a polygonal body with a plurality of corners and mutually inclined first and second terminal portions; introducing a flowable desiccant only into at least one of the terminal portions; thereupon converting the first terminal portion into a substantially L-shaped frame member having a first section extending from one of the corners, a second section abutting or adjacent said second terminal portion, and a corner between said sections; and establishing a seal between said second terminal portion and said second section.

2. The method of claim 1, wherein said introducing step includes filling only a part of said at least one terminal portion.

3. The method of claim 1 of making a spacer frame from a polygonal body having two open-ended terminal portions, further comprising the step of maintaining the body in the course of said introducing step in an orientation such that said at least one terminal portion slopes downwardly from the open end thereof.

4. The method of claim 3, wherein said maintaining step includes suspending the polygonal body and keeping at least one selected part of the suspended body in abutment with an inclined surface.

5. The method of claim 3, wherein said introducing step includes pneumatically conveying flowable desiccant into the open end of the at least one terminal portion.

6. The method of claim 3, wherein said introducing step comprises conveying the desiccant in the at least one terminal portion by gravity flow.

7. The method of claim 3, wherein said establishing step includes inserting a plug into the open end of the second terminal portion and said introducing step includes admitting flowable desiccant into a part of the second terminal portion so as to leave room for insertion of the plug into the open end of the second terminal portion upon completion of said introducing step.

8. The method of claim 1, wherein said introducing step includes admitting desiccant only into that part of the first terminal portion which constitutes the first section upon completion of said converting step.

9. Apparatus for making a spacer frame for use between the panes of a multiple-pane window from a hollow polygonal body having a plurality of corners and mutually inclined first and second terminal portions each of which is adjacent a corner, comprising means for introducing a flowable desiccant into at least one of the terminal portions so as to only partially fill the at least one terminal portion; means for converting the first terminal portion into a substantially L-shaped frame member having a first section adjacent the respective corner, a second section abutting or adjacent the second terminal portion, and a corner between the first and second sections; and means for establishing a seal between the second terminal portion and the second section.

10. The apparatus of claim 9, wherein said introducing means includes a device for admitting a metered quantity of flowable desiccant into the at least one terminal portion of the polygonal body.

11. The apparatus of claim 9, wherein said converting means is adjacent said introducing means.

12. The apparatus of claim 9, wherein said converting means comprises means for engaging that part of the first terminal portion which constitutes the first section of the frame member upon conversion of the first terminal portion into such frame member.

13. The apparatus of claim 9, further comprising means for clamping the second terminal portion during conversion of first terminal portion into said frame member.

14. The apparatus of claim 9 for making a spacer frame from a polygonal body having open-ended terminal portions, wherein said introducing means includes an outlet which is adjacent the open end of the at least one terminal portion prior to conversion of first terminal portion into said frame member, and means for discharging into the open end of the at least one terminal portion a metered quantity of flowable desiccant by way of said outlet prior to conversion of the first tubular portion.

15. The apparatus of claim 9 for making a spacer frame from a polygonal body having open-ended terminal portions, wherein said introducing means includes a guide defining discrete first and second paths for the flow of desiccant and discrete first and second outlets for desiccant flowing along the respective paths, and means for orienting the polygonal body relative to said introducing means so that said first and second outlets respectively register with the open ends of first and second terminal portions of the polygonal body.

16. The apparatus of claim 15, wherein said outlets are disposed above the open ends of the respective terminal portions while the polygonal body is engaged by said orienting means so that desiccant can enter the terminal portions by gravity flow.

17. The apparatus of claim 16, wherein said orienting means includes means for clamping at least a portion of at least one terminal portion of the polygonal body and one of said paths is longer than the other of said paths.

18. The apparatus of claim 15 for making a spacer frame from a polygonal blank having three corners, wherein said orienting means includes means for maintaining the polygonal body in or close to a substantially vertical plane, the terminal portions of the oriented polygonal body sloping downwardly from the respective open ends and said paths being disposed in said plane.

19. The apparatus of claim 9, further comprising means for orienting the polygonal body during introduction of flowable desiccant, said orienting means comprising a first clamping unit having means for engaging the first terminal portion and a second clamping unit having means for engaging the second terminal portion of the polygonal body.

20. The apparatus of claim 19, wherein said clamping units are inclined relative to each other so as to maintain the first and second terminal portions at an angle of approximately 90°.

21. The apparatus of claim 20, wherein said clamping units slope downwardly at opposite sides of a vertical plane between the terminal portions of the oriented polygonal body.

22. The apparatus of claim 21, wherein the terminal portions in said clamping units make with said plane angles of substantially 45°.

23. The apparatus of claim 9, wherein said introducing means defines a relatively short first path for admission of desiccant into the first terminal portion and a longer second path for admission of desiccant into the second terminal portion of the polygonal body.

24. The apparatus of claim 9, wherein said introducing means includes a guide defining at least one path for the flow of desiccant into the at least one terminal portion, and further comprising means for orienting the polygonal body during introduction of desiccant, said guide being movable relative to said orienting means to and from an operative position in which desiccant flowing along said path enters the at least one terminal portion.

25. The apparatus of claim 9, wherein said introducing means includes a source of desiccant, a guide defining at least one path for the flow of desiccant into the at least one terminal portion, and means for admitting metered quantities of desiccant from said source into said path.

26. The apparatus of claim 25, wherein said admitting means includes means for selecting metered quantities of desiccant in such a way that the at least one terminal portion is partially filled with desiccant.

27. The apparatus of claim 9, further comprising means for orienting the profiled body during introduction of desiccant into the at least one terminal portion, said orienting means including a clamping unit having means for engaging the second terminal portion of the polygonal body and means for moving said engaging means substantially longitudinally of the engaged second terminal portion.

28. The apparatus of claim 9, wherein said seal establishing means includes a source of plugs and means for inserting a plug into the terminal portions upon completion of introduction of desiccant into the at least one terminal portion.

29. The apparatus of claim 28, wherein said source comprises a supply of coherent plugs and said seal establishing means further comprises means for singularizing the plugs of said supply and for transporting discrete plugs toward the second terminal portion.

30. The apparatus of claim 29, wherein said source further comprises an indexible rotor and an elongated flexible carrier element which is convoluted onto said rotor and supports said supply of plugs.

31. The apparatus of claim 30, wherein said source further comprises at least one spare rotor and an elongated flexible element which is convoluted onto the spare rotor and supports an additional supply of plugs, said spare rotor being coaxial with said indexible rotor and said rotors being movable axially with reference to said converting and introducing means.

32. The apparatus of claim 9, further comprising means for maintaining the polygonal body in a predetermined orientation during introduction of desiccant into the at least one terminal portion of the body, said introducing means including guide means defining a predetermined path for admission of desiccant into the at least one terminal portion, said guide means having an outlet and being movable to and from an operative position in which said outlet is adjacent the at least one terminal portion of the polygonal body, and further comprising means for triggering the operation of said introducing means in response to movement of said guide means to said operative position.

33. The apparatus of claim 32, wherein said orienting means includes a clamping device having jaws movable into and from engagement with one terminal portion of the polygonal body, said triggering means including means for initiating the movement of said jaws into engagement with the respective terminal portion in response to movement of said guide means to said operative position.

34. The apparatus of claim 9, wherein said converting means includes an anvil adjacent one side of the first terminal portion of the polygonal body and means for bending said second section relative to said first section about said anvil.

35. The apparatus of claim 34, wherein said bending means includes a bending device and a deforming element at the other side of the first terminal portion of the polygonal body.

36. The apparatus of claim 35, wherein said deforming element includes a rolling element and said converting means further comprises means for moving said bending device and said rolling element relative to said anvil.

37. The apparatus of claim 34, wherein said anvil includes an extension extending close to said seal establishing means.

38. The apparatus of claim 9, further comprising a mobile carriage, a turntable mounted on said carriage, and a support for said carriage, said converting means being mounted on said turntable and including means for maintaining the polygonal body in a predetermined orientation with reference to said turntable, said carriage being movable relative to said support between a first position in which said converting means can accept a polygonal body and a second position in which said introducing means can admit desiccant into the at least one terminal portion of the polygonal body.

39. The apparatus of claim 38 for making a spacer frame from a polygonal body having open-ended terminal portions, wherein said maintaining means includes a clamping unit for the second terminal portion of the polygonal body and said clamping unit is arranged to orient the polygonal body in such a way that the terminal portions of the body slope downwardly from the open ends thereof.

40. The apparatus of claim 9 for making a spacer frame from a polygonal body having two spaced-apart walls and two sidewalls alternating with said walls, wherein said converting means comprises an anvil at one side of the first terminal portion of the polygonal body adjacent one of said walls and a mobile deforming element at the other side of the first terminal portion adjacent the other of said walls and disposed substantially opposite said anvil, and means for reducing the mutual spacing of said anvil and said deforming element so as to reduce the mutual spacing of said walls.

41. The apparatus of claim 40 for making a spacer frame from a polygonal body wherein the sidewalls of the polygonal body are disposed at a predetermined distance from each other, wherein said anvil and said deforming element are disposed intermediate said sidewalls during conversion of the first terminal portion into a substantially L-shaped frame member.

42. The apparatus of claim 40, wherein the means for reducing the mutual spacing of said anvil and said deforming element includes means for effecting a movement of the walls of the polygonal body into actual contact with each other in the region of the corner of the substantially L-shaped frame member.

43. The apparatus of claim 40 for making a spacer frame from a polygonal body having two sidewalls disposed at a predetermined distance from each other and two spaced-apart walls having predetermined thicknesses, wherein said anvil and said deforming element have predetermined lengths in the direction from one of said sidewalls toward the other of said sidewalls, said lengths being equal to or approximating said predetermined distance minus 2m wherein m is the thickness of one of said walls.

44. The apparatus of claim 40 for making a spacer frame from a polygonal body having two sidewalls disposed at a predetermined distance from each other, wherein said deforming element includes a roller having a central portion with an axial length at most equal to said predetermined distance and a peripheral portion having an axial length which decreases in a direction away from the axis of said roll toward said anvil.

45. The apparatus of claim 44, wherein the minimum axial length of said peripheral portion is less than said predetermined distance minus 2m wherein m is the thickness of said walls.

46. The apparatus of claim 40, wherein said anvil has a peripheral surface which engages the first terminal portion of the profiled body during conversion of the first terminal portion into a substantially L-shaped frame member, said peripheral surface having a convex outline and further comprising means for moving said anvil toward said deforming element so as to provide the first terminal portion with a recess bounded by a concave surface which is complementary to said peripheral surface.

47. The apparatus of claim 40, wherein said anvil is removable and replaceable with a different anvil.

48. The apparatus of claim 40, wherein said converting means further comprises means for moving said anvil relative to said deforming element.

49. The apparatus of claim 40, wherein said converting means further comprises means for clamping that part of the first terminal portion which constitutes the first section of the substantially L-shaped frame member, said clamping means being adjacent said anvil.

50. The apparatus of claim 40, wherein said anvil includes an extension and said converting means further comprises a bending device arranged to bend that part of the first terminal portion which constitutes the second section of the substantially L-shaped frame member with reference to that part of the first terminal portion which constitutes the first section of such frame member, said bending device being located opposite said extension.

51. The apparatus of claim 50, wherein said extension is pivotable about a predetermined axis with reference to said introducing means in response to bending of the respective part of the first terminal portion by said bending device.

52. The apparatus of claim 40 for making a spacer frame from a polygonal body having said two spaced-apart walls and a neutral line between such walls, wherein said converting means comprises means for moving said anvil toward said deforming element so that said anvil moves one wall of the polygonal body toward or all the way to the neutral line.

53. The apparatus of claim 40, wherein said anvil includes an eccentric protrusion arranged to penetrate into the adjacent part of the first. terminal portion during conversion of the first terminal portion into a substantially L-shaped frame member.

54. The apparatus of claim 53, wherein said anvil includes an elongated extension and said protrusion extends to one side of said extension.

55. The apparatus of claim 54, wherein said converting means further comprises means for turning said anvil and said extension about a predetermined axis to thereby cause penetration of said protrusion into the adjacent part of the first terminal portion.

56. The apparatus of claim 9 for making a spacer frame from a polygonal body having two spaced-apart sidewalls, further comprising stops flanking the sidewalls of the body in the region of the corner of the substantially L-shaped frame member during conversion of first terminal portion of the polygonal body.

57. The apparatus of claim 56, further comprising a support for said introducing and converting means, said support including a portion which constitutes one of said stops.

58. The apparatus of claim 56, further comprising means for moving one of said stops relative to the other of said stops.

* * * * *